(12) United States Patent
Dahmen

(10) Patent No.: US 6,851,703 B2
(45) Date of Patent: Feb. 8, 2005

(54) HOUSING FOR AN AIRBAG MODULE

(75) Inventor: Peter Dahmen, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 10/727,752

(22) Filed: Dec. 4, 2003

(65) Prior Publication Data
US 2004/0108691 A1 Jun. 10, 2004

Related U.S. Application Data

(63) Continuation of application No. PCT/EP02/02011, filed on Feb. 26, 2002.

(30) Foreign Application Priority Data

Jun. 6, 2001 (DE) .......................................... 101 27 509

(51) Int. Cl.$^7$ ........................... B60R 21/20; B60R 21/26
(52) U.S. Cl. ..................... 280/728.2; 280/740; 280/742
(58) Field of Search .......................... 280/728.2, 728.3, 280/740, 736, 742, 732, 730.1

(56) References Cited

U.S. PATENT DOCUMENTS

| 3,895,823 | A | * | 7/1975 | Stephenson ................. 280/740 |
| 5,647,608 | A | * | 7/1997 | Damman et al. ........ 280/728.2 |
| 5,873,598 | A | | 2/1999 | Yoshioka et al. |
| 5,988,677 | A | | 11/1999 | Adomeit et al. |

FOREIGN PATENT DOCUMENTS

| DE | 44 31 718 A1 | 3/1996 |
| DE | 96/15923 | 5/1996 |
| DE | 196 29 541 A1 | 1/1998 |
| DE | 197 36 243 A1 | 3/1998 |
| DE | 298 03 233 U1 | 5/1998 |
| DE | 199 11 682 A1 | 9/2000 |
| DE | 200 08 543 U1 | 10/2000 |
| DE | 199 47 262 A1 | 4/2001 |
| DE | 199 57 578 A1 | 5/2001 |

* cited by examiner

Primary Examiner—Peter C. English
(74) Attorney, Agent, or Firm—Laurence A. Greenberg; Werner H. Stemer; Manfred Beck

(57) ABSTRACT

A housing for an airbag module is provided. In an inactivated basic position, the folded airbag is provided laterally adjacent to the gas generator. The airbag is connected to the gas generator via at least one gas channel. The housing includes an airbag-accommodating space and laterally adjacent, but separated from the airbag-accommodating space, a gas-generator-accommodating space. An airbag emergence opening is formed in a wall of the airbag-accommodating space and covered with a covering device. The at least on gas channel is, at least partially, an integral component of the housing wall and extends from the gas-generator-accommodating space to a lower housing wall area of the airbag-accommodating space opposite the covering device in order to introduce gas into the airbag from below in the airbag emergence direction.

24 Claims, 3 Drawing Sheets

HOUSING FOR AN AIRBAG MODULE

CROSS-REFERENCE TO RELATED APPLICATION

This application is a continuation of copending International Application No. PCT/EP02/02011, filed Feb. 26, 2002, which designated the United States and was not published in English.

BACKGROUND OF THE INVENTION

Field of the Invention

The invention relates to a housing for an airbag module and an occupant protection device.

Housings for airbag modules are generally known, for example, in conjunction with front passenger airbag modules. These airbag modules generally have the airbag and the gas generator situated one behind the other when viewed in an airbag emergence direction, thus resulting in a relatively tall construction of the airbag module. These tall front passenger airbag modules limit the possible installation positions in an instrument panel of a motor vehicle, for example in the region in the vicinity of the windshield. It is therefore often desirable to have a relatively flat housing for a compact installation of the airbag modules. For this purpose German Utility Model No. DE 200 08 543 U1 discloses, in conjunction with a side airbag, which is accommodated in the roof frame region of a motor vehicle, to provide a gas generator laterally next to an airbag which, in the non-activated basic state, is folded up. The airbag is arranged around the gas generator, with the result that the latter blows gas directly into the airbag via corresponding blow-out openings on the gas generator.

However, a disadvantage of this construction is that, for example, for the purpose of maintenance, repair or exchange of individual parts and components, the entire module has to be removed every time here.

Furthermore, Published, Non-Prosecuted German Patent Application No. DE 199 11 682 A1 discloses a housing for an airbag module, wherein the housing is formed by a steering-wheel hub region of a steering wheel. A steering-wheel airbag module is installed in the hub region of the steering wheel wherein the gas generator is arranged in a lateral housing region. An airbag flap which forms the covering device is formed in a section, which is situated at the top in straight-ahead driving, and formed by an opposite edge side of the steering-wheel hub housing. Starting from the gas generator, which is arranged at the opposite end, as seen in cross section, a diffuser pipe, as a separate component which forms the gas duct, is guided along a hub-housing bottom wall and then along a hub-housing side wall upward in the direction of the airbag flap. As a result, a clearance, in which the folded up airbag is accommodated in the non-activated basic position, is formed between the vertical segment of the diffuser pipe, which segment is guided upward in the direction of the airbag flap, and the gas generator. A fabric layer of the airbag is guided around the gas blow-out opening, which is formed in the diffuser-pipe end segment in the vicinity of the airbag flap, so that, when the airbag module is activated, the gas is blown into the airbag from the side. The effect which is to be achieved by this is that the airbag is pulled gradually out of the hub housing during its deployment, so that it is possible for the airbag to initially be deployed laterally upward in front of or behind that segment of the steering-wheel rim which is situated at the top in straight-ahead driving, and only then in the direction of the occupant. A construction of this type is therefore obviously practicable only in conjunction with a steering-wheel airbag, but not, for example, in conjunction with front passenger airbags. Furthermore, the inflation process as a whole is disadvantageously delayed with a configuration of this type, with the result that it may no be possible to bring this airbag into its operational position in a timely manner. In addition, a fabric layer of the airbag is guided around the gas generator and the diffuser pipe, so that the entire module has to be exchanged during maintenance, airbag or gas generator exchange or the like.

U.S. Pat. No. 5,873,598 discloses a generic housing for an airbag module, in particular as part of an occupant protection device for motor vehicles, having at least one airbag which is accommodated in an airbag-accommodating space of the housing and which, in the non-activated basic position of the airbag module, is arranged folded up in the airbag-accommodating space behind a covering device, which, in the non-activated basic position, closes an airbag outlet opening, which is formed in a housing wall of the airbag-accommodating space and forms part of the housing wall, and, in the activated state of the airbag module, opens up the airbag outlet opening so that the airbag is deployed freely. Furthermore, at least one correspondingly assigned gas generator is provided which is accommodated in a gas-generator-accommodating space of the housing, the airbag-accommodating space being separated from the gas-generator-accommodating space by a common partition wall.

In specific terms, the gas-generator-accommodating space is disposed here, with reference to the airbag outlet opening plane, below the airbag-accommodating space, as a result of which a relatively large and not very compact construction is obtained. The airbag-accommodating space is separated from the gas-generator-accommodating space by the partition wall in the form of an intermediate wall, the partition wall, as seen in cross section, being folded in a lateral region in a doubling of the material in such a manner that a separating wall which protrudes from the partition wall in the direction of the airbag-accommodating space is formed on the partition wall. This separating wall separates the airbag-accommodating space into a region acting as a gas duct and into an accommodating region, in which the folded up air bag is accommodated. Via the gas-generator-accommodating space, gas passes through corresponding passage openings, first of all into the chamber region of the airbag-accommodating housing, which region is formed as a gas-conducting duct, and then into the airbag, in which case the gas is blown laterally into the airbag. The intention of a construction of this type is to avoid that gas is being blown in the middle and centrally into the airbag. In particular, the gas-conducting duct is arranged here on a side of an airbag outlet opening that, in the installed state, faces away from the vehicle occupant in order to achieve that, during the further course of the inflation process, the airbag is not inflated immediately but with a time delay, in the direction of the vehicle occupant.

U.S. Pat. No. 5,988,677 discloses an airbag module, in which a diffuser of a gas generator is accommodated in a fold of the folded-up airbag so as to obtain a controlled inflation of the airbag. The gas generator is arranged here, with reference to the airbag outlet opening plane, below the folded-up airbag.

SUMMARY OF THE INVENTION

It is accordingly an object of the invention to provide a housing for an airbag module, in particular as part of an occupant protection device for motor vehicles, that overcomes the above-mentioned disadvantages of the heretofore-known devices of this general type and that has a flat construction and, in addition, allows a simple exchange of individual components of the airbag module.

With the foregoing and other objects in view, there is provided, in accordance with the invention, in combination with an airbag module having an airbag and a gas generator assigned to the airbag, a housing configuration, including:

- a housing having an airbag-accommodating space and a gas-generator-accommodating space formed therein;
- the housing having a housing wall with an airbag outlet opening formed therein and having a covering device, the covering device being configured to close the airbag outlet opening when the airbag module is in a non-activated basic position and to open up the airbag outlet opening so that the airbag deploys freely when the airbag module is in an activated state;
- the gas-generator-accommodating space accommodating the gas generator, the airbag-accommodating space accommodating the airbag such that the airbag is disposed folded up in the airbag-accommodating space behind the covering device when the airbag module is in the non-activated basic position;
- the airbag outlet opening defining an airbag outlet opening plane, the airbag-accommodating space being situated, with reference to the airbag outlet opening plane, laterally next to the gas-generator-accommodating space;
- the housing having a lower housing wall region disposed opposite the covering device and bounding the airbag-accommodating space;
- the housing having a gas-generator-accommodating-space housing wall extending substantially parallel to the lower housing wall region;
- a partition wall separating the airbag-accommodating space from the gas-generator-accommodating space, the partition wall extending in a direction away from the upper housing wall into an interior of the housing as far as the lower housing wall region;
- the lower housing wall region and the gas-generator-accommodating-space housing wall together forming a gas-duct segment configured such that gas is guided along an airbag emergence direction away from a housing side opposite the airbag outlet opening plane and into the airbag; and
- the gas duct segment being disposed in the housing on the housing side opposite the airbag outlet opening plane, the gas duct segment extending substantially parallel to the airbag outlet opening plane and extending, when viewed in cross section through the housing, from the gas-generator-accommodating space to the airbag-accommodating space.

In other words, according to the invention, there is provided, a housing for an airbag module, in particular as part of an occupant protection device for motor vehicles, having at least one airbag which is accommodated in an airbag-accommodating space or airbag-accommodating chamber of the housing and, in the non-activated basic position of the airbag module is provided folded up in the airbag-accommodating space behind a covering device which, in the non-activated basic position, closes an airbag outlet opening, which is formed in a housing wall of the airbag-accommodating space and forms part of the wall, and, in the activated state of the airbag module, opens up the airbag outlet opening so that the airbag is deployed freely, and having at least one correspondingly assigned gas generator which is accommodated in a gas-generator-accommodating space or gas-generator-accommodating chamber of the housing, the airbag-accommodating space being separated from the gas-generator-accommodating space by a common partition wall. The airbag-accommodating space is situated, with reference to the airbag outlet opening plane, laterally next to the gas-generator-accommodating space, the partition extending away inward from the upper housing wall, which forms the airbag outlet opening, into the housing as far as a lower housing wall region of the airbag-accommodating space, the region lying opposite the upper housing wall and therefore the covering device. The lower housing wall region forms, as seen in cross section through the housing, together with a gas-generator-accommodating-space housing wall running parallel thereto on the housing side provided opposite the airbag outlet opening plane, a gas-duct segment, which runs approximately horizontally, with reference to the airbag outlet opening plane, from the gas-generator-accommodating space to the airbag-accommodating space in such a manner that gas is introduced into the airbag from the housing side lying opposite the airbag outlet opening plane and therefore from below in the airbag outlet direction.

A construction of this type has a number of advantages. Firstly, the position of the gas generator next to the folded-up airbag means that a flat, compact housing can be formed which allows a variety of possible installation positions, for example, even in a region of an instrument panel which is in the vicinity of the windshield. Furthermore, the gas generator is advantageously isolated here from the airbag, so that exchange of, for example, the gas generator when there is a repair, maintenance or exchange, is easily possible without the airbag and therefore the entire module also having to be removed for this purpose.

Due to the fact that the gas duct is, at least in some regions, an integral part of the housing wall, an advantageous integration of functions is obtained, since housing walls which have to be provided in any case can also be used simultaneously in a dual function to form the gas duct. A particularly compact construction is therefore possible. Furthermore, a particularly simple and inexpensive construction can also be obtained thereby, even more so if the housing is configure, for example, as an extruded profile.

With gas introduced from below, as seen in the airbag emergence direction, a particularly rapid and functionally reliable inflation of the airbag is also possible, even though the gas generator is disposed laterally next to the folded-up airbag.

According to another feature of the invention, the gas-duct end segment protrudes as a pillar into a substantially central region of the airbag-accommodating space, when viewed in cross section, such that the gas-duct end segment extends from below substantially into a center of the airbag being folded up in the airbag-accommodating space in order to introduce gas centrally, and the gas distributor has at least one gas blowout opening formed therein for a flow of gas into the airbag.

If the gas duct protrudes with a gas-duct end segment as a gas distributor in the manner of a pillar into, as seen in cross section, an approximately central region of the airbag-accommodating space and therefore from below approximately into the middle of the folded-up airbag, gas can advantageously be introduced centrally and in the middle from below into the airbag, so that the airbag can be uniformly and rapidly inflated at a constant filling pressure which is distributed uniformly in the airbag. This increases the functional reliability of an airbag as a whole, since the latter, having a specific construction of this type, can be inflated in a particularly rapid and targeted manner into a predetermined operational position.

According to a further feature of the invention, the gas distributor has at least one gas blow-out opening formed on an end side of the gas distributor in order to direct a flow of gas in a direction toward the covering device such that gas flows in the airbag emergence direction.

According to another feature of the invention, the airbag module, when in the activated state, produces a flow of gas introduced via the gas duct from below into the airbag and inflates the airbag such that the air bag exerts a lift-off force on the covering device and, the flow of gas being directed via the gas duct in the airbag emergence direction exerts an additional lift-off force on the covering device.

Since the at least one gas blow-out opening of the gas distributor is orientated in the direction of the covering device and therefore in the direction of the airbag outlet opening, the flow of gas can, in addition, also be used to exert a lift-off force on the covering device, the force acting in addition to the lift-off force which is exerted on the covering device by the inflating airbag, and, as a result, a particularly rapid and functionally reliable opening of the airbag outlet opening is brought about by lifting off or swinging open the covering device. The inflation process of the entire airbag as a whole therefore becomes substantially more functionally reliable, with the result that the airbag can be inflated rapidly in the predetermined operational position.

According to another feature of the invention, the housing has a substantially rectangular cross section, and the airbag-accommodating space and the gas-generator-accommodating space provided in the housing each have a substantially rectangular cross section and are separated from one another by the partition wall as a common wall therebetween.

A particularly compact and flat construction with advantageous housing geometries is produced if the housing is of approximately rectangular configuration in cross section with an approximately rectangular airbag-accommodating space and an approximately rectangular gas-generator-accommodating space, the accommodating spaces being separated from each other by a common partition wall. In addition, the expenditure of materials can also advantageously be reduced by this common partition wall, since the partition wall serves in a dual function both as the housing wall for the airbag-accommodating space and for the gas-generator-accommodating space.

According to another feature of the invention, the gas distributor adjoins the gas-duct segment and extends substantially vertically upward into the airbag-accommodating space such that the gas duct is a substantially L-shaped gas duct.

In other words, according to a particularly preferred embodiment, a lower gas-generator-accommodating-space housing wall, which, as seen in cross section, lies opposite the upper housing wall, in which the airbag outlet opening is formed, is offset downward with respect to a lower airbag-accommodating-space housing wall, which, as seen in cross section, likewise lies opposite the upper housing wall, and, in order to form a gas-duct segment which runs approximately horizontally, the lower gas-generator-accommodating-space housing wall is guided approximately parallel to the airbag-accommodating-space side wall, approximately as far as the central airbag-accommodating-space region. The pillar-like gas distributor, extending approximately vertically, adjoins this gas-duct segment upward into the airbag-accommodating space. In a specific embodiment of this type, the entire gas duct is approximately in an L-shape. With a specific configuration of this type, a particularly compact, flat and functionally reliable construction, which is suitable for many installation positions, is possible.

According to another feature of the invention, there is provided a gas duct having a gas-duct end segment protruding from the lower housing wall region and forming a gas distributor, the gas distributor being configured as an integral part of the lower housing wall region and extending, when viewed in cross section, as a double-walled part from the lower housing wall region disposed opposite the covering device, upward into the airbag-accommodating space.

In other words, the gas distributor is preferably likewise an integral part of the housing wall and, as a result, is guided in a correspondingly double-walled manner, as seen in cross section, starting from the lower housing wall region, which lies opposite the covering device, upward into the airbag-accommodating space. This is particularly simple to produce, for example, with an extrusion process, and does not require any additional outlay on components.

According to another feature of the invention, there is provided, a gas duct having a gas-duct end segment protruding from the lower housing wall region and forming a gas distributor, the gas duct segment has a gas-duct mouth at the lower housing wall region opposite the covering device, and the gas distributor is a separate component fastened at the gas-duct mouth. The gas distributor is preferably selected from a set including a number of gas distributors having respectively different numbers of gas blow-out openings and/or respectively different gas blow-out opening geometries.

In other words, the gas distributor may alternatively be configured as a separate component which can be fastened, preferably in a gastight manner, in the region of a gas-duct mouth in the lower housing wall region lying opposite the covering device. The gas distributor here can advantageously be part of a set of gas distributors which each have different flow cross sections and/or different numbers of blow-out openings and/or different geometries of blow-out openings. This makes it possible to adapt the flow profile in a particularly individual manner to the respectively prevailing inflation conditions for an airbag.

According to another feature of the invention, the gas distributor has latching devices, and the lower housing wall region has mating latching devices at the gas-duct mouth for releasably latching to the latching devices. In other words, in the event of the gas distributor being configured as a separate component, the gas distributor can have corresponding latching devices on the gas-duct-mouth side, with which the gas distributor can be releasably latched and/or locked to corresponding mating latching devices on the housing wall side. Latching devices and mating latching devices of this type make it possible for the gas distributor, which is provided as a separate component, to be secured particularly easily in the airbag-accommodating space.

According to another feature of the invention, the gas distributor extends in the airbag-accommodating space such that a gap clearance is provided between the gas distributor and the covering device and such that the gas distributor divides the airbag-accommodating space substantially in half when viewed in cross section, into left and right airbag-accommodating-space portions, and the left and the right airbag-accommodating-space portions accommodate a respective folded portion of the airbag. Preferably, the airbag has a fabric layer spanning from the left airbag-accommodating-space portion to the right airbag-accommodating-space portion. In other words, in a preferred embodiment, the gas distributor extends in the airbag-accommodating space with a gap clearance virtually as far as the covering device, and the gas distributor divides the airbag-accommodating space, as seen in cross section, into a left and right airbag-accommodating-space half, in each of which a substantial portion of the folded airbag is accommodated. The airbag is guided from the left to the right half, spanning the gas distributor, with preferably one fabric layer. With geometrical ratios of this type, a particularly advantageous rapid inflation of the airbag is possible with high functional reliability.

According to yet another feature of the invention, the lower housing wall region has edge regions disposed opposite from one another, when viewed in cross section, and the airbag is fastened in a gastight manner to the edge regions of the lower housing wall region.

In principle, there are various possibilities for fastening the airbag in the airbag-accommodating space. According to one preferred embodiment, the airbag is fastened, preferably in a gastight manner, in the housing wall region, preferably to edge regions of the housing wall, the edge regions lying opposite, as seen in cross section. It is particularly advantageous here to secure the free ends of the airbag to a lower housing wall region, for example via a clip connection or latching connection. This advantageously makes particularly simple folding of the airbag laterally next to the pillar-like gas distributor possible.

According to another feature of the invention, the housing has a longitudinal extent defining a longitudinal direction, and the gas duct and/or the gas distributor extend in the longitudinal direction along at least a part of the longitudinal extent of the housing.

In principle, it is possible for a plurality of individual gas ducts to be disposed next to one another and, if appropriate, spaced apart from one another, as seen in the longitudinal direction of the housing. According to one particularly preferred refinement, the gas duct and/or the gas distributor of the gas duct extend, however, as seen in longitudinal section, at least in some regions in the longitudinal direction along the housing. For example, the gas blow-out opening can then be formed here in the form of a slot or by a plurality of individual gas blow-out opening holes which lie spaced apart next to one another. A longitudinal extent of this type allows a sufficiently large amount of gas to be passed through the gas duct into the airbag, which advantageously contributes to inflating the airbag rapidly in its predetermined operational position.

According to another feature of the invention, the housing has an open end side for access into the gas-generator-accommodating space and the airbag-accommodating space, and end side cover parts close the open end side of the housing when the airbag module is installed. In other words, the housing is particularly advantageously configured to be open on an end side for access into the gas-generator-accommodating space and into the airbag-accommodating space, such that it is possible, after installation of the airbag module, i.e. of the gas generator and the airbag, to close the gas-generator-accommodating space and the airbag-accommodating space, preferably in a gastight manner, by a cover part. This permits particularly easy accessibility to the airbag, on the one hand, and to the gas generator, on the other, to be precise independently of each other. Thus, for example, the airbag can be serviced, installed or exchanged etc. independently of the gas generator or the gas generator can be serviced, installed or exchanged etc. independently of the airbag without the entire module being removed. Easy accessibility to these accommodating spaces is ensured via the cover parts. The cover parts are advantageously screwed for this purpose to the housing, which permits particularly easy removal and therefore particularly easy access to the accommodating spaces. In principle, there is also the possibility here of using a continuous cover for both accommodating spaces, in which case, in the situation in which, for example, access is required only to the gas-generator-accommodating space, the access to the airbag-accommodating space is then also opened up every time.

According to another feature of the invention, the cover is pivotably coupled to the edge region of the airbag outlet opening or the cover is releasably latched to the edge region of the airbag outlet opening.

In principle, there are furthermore various possibilities for forming the covering device. Thus, the covering device may be formed, for example, by one or more flaps which are coupled pivotably in the outlet-opening edge region. Similarly, the covering device can be formed by a cover which is coupled pivotably and/or latched releasably to the outlet-opening edge region. As a result, rapid and functionally reliable opening up of the airbag outlet opening can be obtained.

According to another feature of the invention, the airbag outlet opening in the upper housing wall extends substantially over the entire airbag-accommodating space. In other words, the airbag outlet opening preferably extends essentially over the entire upper housing wall region in the region of the airbag-accommodating space, thus permitting particularly free and unobstructed deployment of the airbag into the vehicle interior.

According to a further feature of the invention, the housing is an extruded housing.

According to a further feature of the invention, the airbag module is a front passenger airbag module of a motor vehicle, which is installed in the vicinity of the windshield.

With the objects of the invention in view, there is also provided, in combination with a motor vehicle having a windshield, an occupant protection device, including:

a front passenger airbag module installed near the windshield, the front passenger airbag module having an airbag and a gas generator assigned to the airbag;

a housing having an airbag-accommodating space and a gas-generator-accommodating space formed therein;

the housing having a housing wall with an airbag outlet opening formed therein and having a covering device, the covering device being configured to close the airbag outlet opening when the front passenger airbag module is in a non-activated basic position and to open up the airbag outlet opening so that the airbag deploys freely when the front passenger airbag module is in an activated state;

the gas-generator-accommodating space accommodating the gas generator, the airbag-accommodating space accommodating the airbag such that the airbag is disposed folded up in the airbag-accommodating space behind the covering device when the front passenger airbag module is in the non-activated basic position;

the airbag outlet opening defining an airbag outlet opening plane, the airbag-accommodating space being situated, with reference to the airbag outlet opening plane, laterally next to the gas-generator-accommodating space;

the housing having a lower housing wall region disposed opposite the covering device and bounding the airbag-accommodating space;

the housing having a gas-generator-accommodating-space housing wall extending substantially parallel to the lower housing wall region;

a partition wall separating the airbag-accommodating space from the gas-generator-accommodating space, the partition wall extending in a direction away from the upper housing wall into an interior of the housing as far as the lower housing wall region;

the lower housing wall region and the gas-generator-accommodating-space housing wall together forming a gas-duct segment configured such that gas is guided along an airbag emergence direction away from a housing side opposite the airbag outlet opening plane and into the airbag; and the gas duct segment being disposed in the housing on the housing side opposite the airbag outlet opening plane, the gas duct segment extending substantially parallel to the airbag outlet opening plane and extending, when viewed in cross section through the housing, from the gas-generator-accommodating space to the airbag-accommodating space.

Other features which are considered as characteristic for the invention are set forth in the appended claims.

Although the invention is illustrated and described herein as embodied in a housing for an airbag module, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
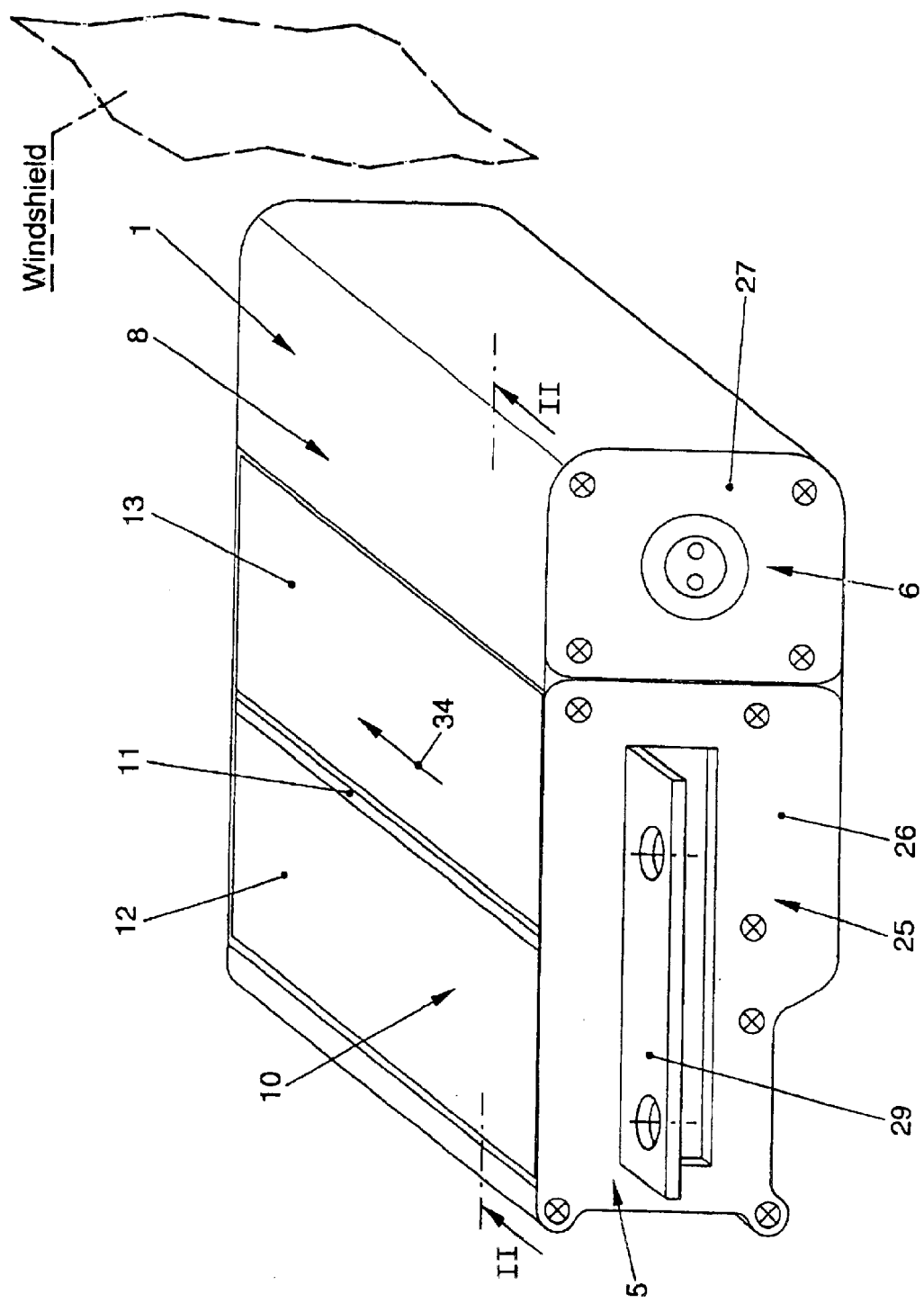
FIG. 1 is a diagrammatic perspective view of a housing according to the invention for an airbag module.

Referring now to the figures of the drawings in detail and first, particularly to FIG. 1 thereof, there is schematically shown, by way of example, a flat housing 1 for an airbag module, as part of an occupant protection device for a motor vehicle, in the assembled state. As is apparent in particular from FIG. 2, which shows a schematic cross section along section line II—II in FIG. 1, the airbag module 2 includes an airbag 3 and a gas generator 4. In the non-activated state of the airbag module 2 that is shown in FIG. 1, the airbag 3 is accommodated folded up in an airbag-accommodating space 5 of the housing 1, which space is situated laterally next to a gas-generator-accommodating space 6 of the housing 1, which is separated from the airbag-accommodating space 5 by a common partition wall 7 and in which the gas generator 4 is accommodated.

The flat housing 1 is approximately rectangular in cross section, the airbag-accommodating space 5 and the gas-generator-accommodating space 6 also having an approximately rectangular cross section.

Figure 2:
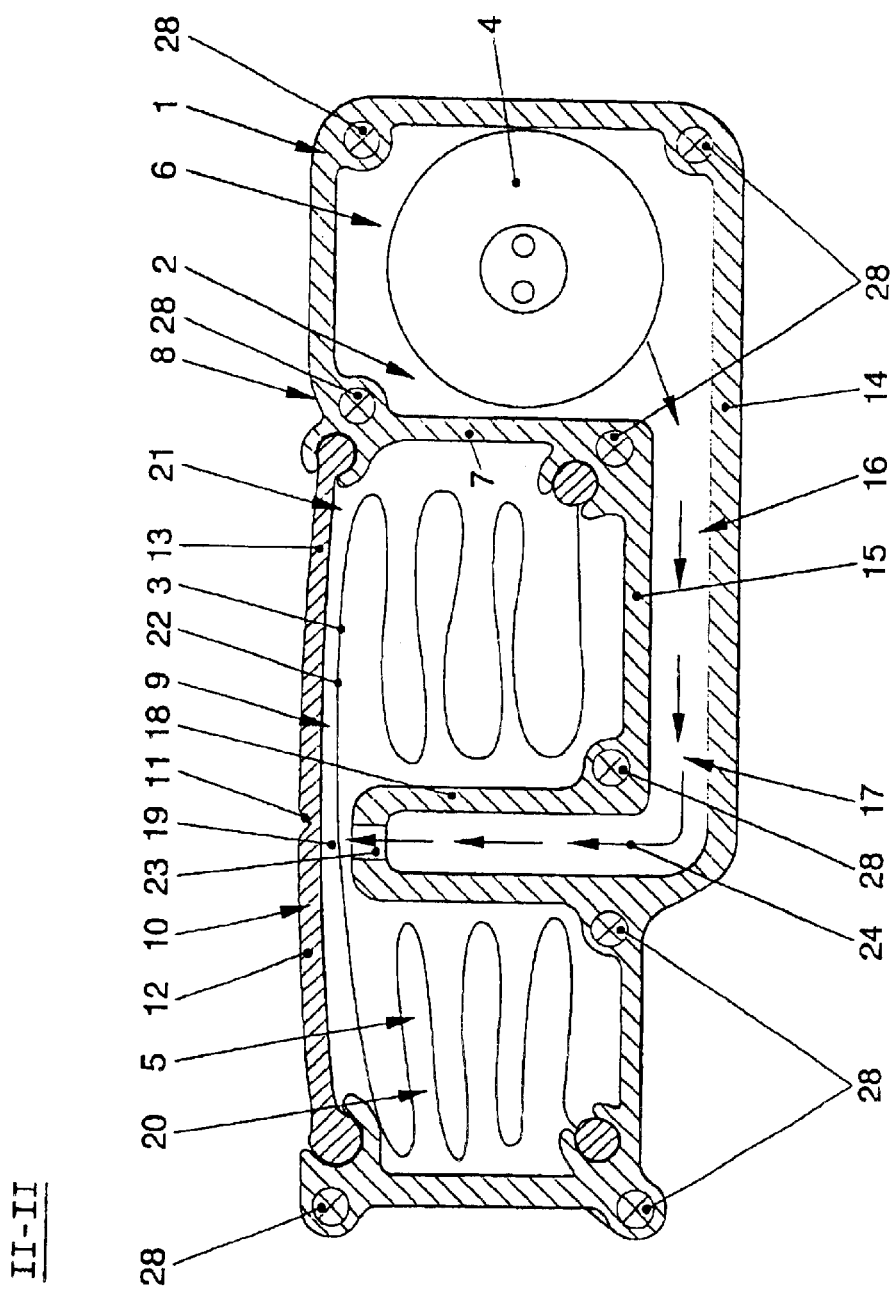
FIG. 2 is a diagrammatic cross sectional view of the housing of FIG. 1 along the section line II—II.

It can furthermore also be gathered from FIGS. 1 and 2 that an upper housing wall 8 has, in the region of the airbag-accommodating space 5, an airbag outlet opening 9 which extends virtually over the entire area of the airbag-accommodating space 5 and is closed through the use of a cover 10 as covering device. This cover 10 is, as can be gathered in particular from FIG. 2, coupled, preferably pivotably, in the edge region of the airbag outlet opening 9 and has a central predetermined tear-open line 11 which is continuous in the longitudinal direction of the housing, so that, in the event of the airbag inflating, the cover 10 tears open along the predetermined tear-open line 11 and forms two flap parts 12, 13 which can be pivoted about the coupling points, which are on the edge of the airbag outlet opening, in order to open up the airbag outlet opening 9.

As can furthermore be gathered from FIG. 2, a lower gas-generator-accommodating-space housing wall 14, which, as seen in cross section, lies opposite the upper housing wall 8 and therefore the airbag outlet opening side, is offset downward with respect to a lower airbag-accommodating-space housing wall 15, as seen in cross section. Furthermore, this lower gas-generator-accommodating-space housing wall 14 is guided approximately parallel to the airbag-accommodating-space housing wall 15 approximately as far as the central airbag-accommodating-space region in order to form a gas-duct segment 16, which runs approximately horizontally, of a gas duct 17 forming an integral part of the housing wall. Starting from this airbag-accommodating-space region, a gas-duct end segment, which forms a gas distributor 18 and which runs approximately vertically, adjoins this gas-duct segment 16 upward into the airbag-accommodating space 5, with the result that this gas distributor 18 protrudes in the manner of a pillar into an approximately central region of the airbag-accommodating space 5, as seen in cross section in FIG. 2, and therefore, for the purpose of introducing gas centrally from below, approximately into the middle of the folded-up airbag 3. The gas distributor 18 is likewise an integral part of the housing wall and, as a result, is guided in a correspondingly double-walled manner, as seen in cross section, starting from the lower housing wall region, which lies opposite the cover 10, upward into the airbag-accommodating space 5.

The gas distributor 18 extends in the airbag-accommodating space with a gap clearance 19 virtually as far as the cover 10 and therefore divides the airbag-accommodating space 5, as seen in the cross section of FIG. 2, into a left and right airbag-accommodating-space half 20, 21, in each of which a substantial portion of the folded airbag 3 is accommodated, the airbag being guided from the left airbag-accommodating-space half 20 to the right airbag-accommodating-space half 21, in a manner spanning the gas distributor 18 with a fabric layer 22.

The gas duct 17 and therefore also the gas distributor 18 extend, as seen in the longitudinal direction 34 of the housing, at least along some regions along the housing 1.

The gas distributor 18 has, as is apparent from FIG. 2, on the end side, a gas blow-out opening 23 which is produced, for example, by milling and with which a flow of gas can be orientated in the direction of the cover 10 and therefore in the direction of the airbag outlet opening 9, as is illustrated schematically by the arrows 24 in the illustration of FIG. 2.

As can furthermore be gathered from FIG. 2, the airbag 3 is joined in a gastight manner to edge regions of the lower airbag-accommodating-space housing wall, the edge regions lying opposite one another, as seen in cross section.

The housing 1 is configured such that it is open at least on one end side 25 for access into the gas-generator-accommodating space 6 and for access into the airbag-accommodating space 5, such that it is possible for the gas-generator-accommodating space 6 and the airbag-accommodating space 5 each to be closed, preferably in a gastight manner, by a separate cover part 26, 27, after the airbag 3 and the gas generator 4 have been inserted. In this case, the cover parts 26, 27 can be screwed at a number of points to the housing 1, for which purpose corresponding fastening points 28 are formed in the region of the housing walls, if appropriate in the region of a thickening of material of the wall side.

The housing 1 is preferably produced as an extruded profile by extrusion and can be inserted, for example, in the region in the instrument panel of a motor vehicle that is in the vicinity of the windshield. In this case, the housing 1 can be fastened via fastening flanges 29, only one of which is illustrated by way of example in FIG. 1.

In the event of the installed airbag module 2 being activated, the gas produced in the gas generator 4 is therefore blown via the gas duct 17 and therefore via the gas distributor 18 and via the gas blow-out opening 23 from below centrally into the airbag 3, as a result of which the latter is inflated in the airbag-accommodating space 5 and exerts a pressure on the cover 10 which tears open along the predetermined tear-open line 11. This pressure on the cover 10 is additionally assisted by the flow of gas which is orientated in the direction of the cover 10.

Figure 3:
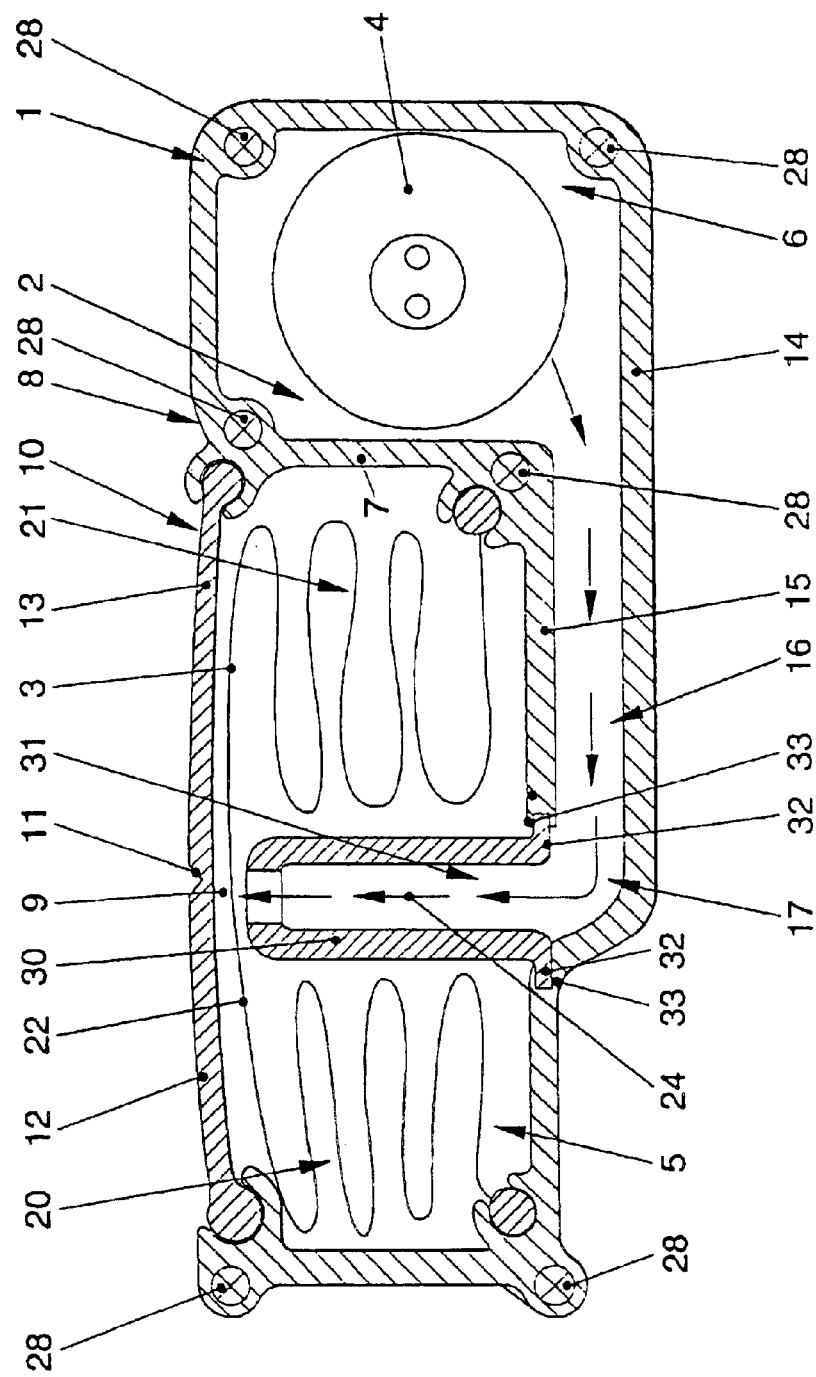
FIG. 3 is a diagrammatic cross sectional view of an alternative embodiment of a housing according to the invention.

FIG. 3 illustrates an alternative embodiment to FIG. 2, in which a gas distributor 30 is configured as a separate component which can be latched in a gastight manner in the region of a gas-duct mouth 31 defined by the lower housing walls 14, 15, for which purpose latching elements 32 are provided on the gas distributor 30 and can be latched into corresponding mating latching elements 33 on the lower housing walls 14, 15. This allows, for example, gas distributors 30 having different flow cross sections and different geometries of the blow-out opening to be exchanged as desired.

I claim:

1. In combination with an airbag module having an airbag and a gas generator assigned to the airbag, a housing configuration, comprising:
    a housing having an airbag-accommodating space and a gas-generator-accommodating space formed therein;
    said housing having an upper housing wall with an airbag outlet opening formed therein and having a covering device, said covering device being configured to close said airbag outlet opening when the airbag module is in a non-activated basic position and to open up said airbag outlet opening so that the airbag deploys freely when the airbag module is in an activated state;
    said gas-generator-accommodating space accommodating the gas generator, said airbag-accommodating space accommodating the airbag such that the airbag is disposed folded up in said airbag-accommodating space behind said covering device when the airbag module is in the non-activated basic position;
    said airbag outlet opening defining an airbag outlet opening plane, said airbag-accommodating space being situated, with reference to the airbag outlet opening plane, laterally next to said gas-generator-accommodating space;
    said housing having a lower housing wall region disposed opposite said covering device and bounding said airbag-accommodating space;
    said housing having a gas-generator-accommodating-space housing wall extending substantially parallel to said lower housing wall region;
    a partition wall separating said airbag-accommodating space from said gas-generator-accommodating space, said partition wall extending in a direction away from said upper housing wall into an interior of said housing as far as said lower housing wall region;
    said lower housing wall region and said gas-generator-accommodating-space housing wall together forming a gas-duct segment configured such that gas is guided along an airbag emergence direction away from a housing side opposite the airbag outlet opening plane and into the airbag; and
    said gas duct segment being disposed in said housing on the housing side opposite the airbag outlet opening plane, said gas duct segment extending substantially parallel to said airbag outlet opening plane and extending, when viewed in cross section through said housing, from said gas-generator-accommodating space to said airbag-accommodating space.

2. The housing configuration according to claim 1, including:
    a gas duct having a gas-duct end segment forming a gas distributor;
    said gas-duct end segment protruding as a pillar into a substantially central region of said airbag-accommodating space, when viewed in cross section, such that said gas-duct end segment extends from below substantially into a center of the airbag being folded up in said airbag-accommodating space in order to introduce gas centrally; and
    said gas distributor having at least one gas blow-out opening formed therein for a flow of gas into the airbag.

3. The housing configuration according to claim 2, wherein said gas distributor adjoins said gas-duct segment extending substantially parallel to said outlet opening plane and extends substantially vertically upward into said airbag-accommodating space such that said gas duct is a substantially L-shaped gas duct.

4. The housing configuration according to claim 1, including:
    a gas duct having a gas-duct end segment protruding from said lower housing wall region and forming a gas distributor; and
    said gas distributor having at least one gas blow-out opening formed on an end of said gas distributor in order to direct a flow of gas in a direction toward said covering device such that gas flows in the airbag emergence direction.

5. The housing configuration according to claim 1, wherein:
    said housing has a substantially rectangular cross section; and
    said airbag-accommodating space and said gas-generator accommodating space provided in said housing each have a substantially rectangular cross section and are separated from one another by said partition wall as a common wall therebetween.

6. The housing configuration according to claim 1, including a gas duct having a gas-duct end segment protruding from said lower housing wall region and forming a gas distributor, said gas distributor being configured as an integral part of said lower housing wall region and extending, when viewed in cross section, as a double-walled part from said lower housing wall region disposed opposite said covering device, upward into said airbag-accommodating space.

7. The housing configuration according to claim 1, including:
a gas duct having a gas-duct end segment protruding from said lower housing wall region and forming a gas distributor;
said gas duct segment has a gas-duct mouth at said lower housing wall region opposite said covering device; and
said gas distributor is a component separate from said gas duct segment and is fastened to said gas duct segment at said gas-duct mouth.

8. The housing configuration according to claim 7, wherein said gas distributor is fastened in a gas tight manner to said lower housing wall region at said gas-duct mouth.

9. The housing configuration according to claim 7, wherein said gas distributor has at least one gas blow out opening and is capable of being interchanged with another gas distributor having a different number of gas blow-out openings or a different gas blow-out opening geometry.

10. The housing configuration according to claim 7, wherein:
said gas distributor has latching devices; and said lower housing wall region has mating latching devices for releasably latching to said latching devices.

11. The housing configuration according to claim 1, including:
a gas duct having a gas-duct end segment protruding from said lower housing wall region and forming a gas distributor;
said gas distributor extending in said airbag-accommodating space such that a gap clearance is provided between said gas distributor and said covering device and such that said gas distributor divides said airbag-accommodating space substantially in half when viewed in cross section, into left and right airbag-accommodating-space portions; and
said left and said right airbag-accommodating-space portions accommodating a respective folded portion of said airbag.

12. The housing configuration according to claim 11, wherein said airbag has a fabric layer spanning from said left airbag-accommodating-space portion to said right airbag-accommodating-space portion.

13. The housing configuration according claim 1, wherein:
said lower housing wall region has edge regions disposed opposite from one another, when viewed in cross section; and
said airbag is fastened in a gastight manner to said edge regions of said lower housing wall region.

14. The housing configuration according to claim 1, including:
a gas duct having a gas-duct end segment protruding from said lower housing wall region and forming a gas distributor;
said housing having a longitudinal extent defining a longitudinal direction; and
at least one of said gas duct and said gas distributor extending in the longitudinal direction along at least a part of the longitudinal extent of said housing.

15. The housing configuration according to claim 1, wherein:
said housing has an open side for access into said gas-generator-accommodating space and said airbag-accommodating space; and side cover parts close said open side of said housing when said airbag module is installed.

16. The housing configuration according to claim 15, wherein said side cover parts close said open side of said housing in a gastight manner.

17. The housing configuration according to claim 15, wherein said side cover parts are screwed to said housing.

18. The housing configuration according to claim 1, wherein:
said airbag outlet opening has an edge region; and
said covering device is a cover secured to said edge region of said airbag outlet opening.

19. The housing configuration according to claim 18, wherein said cover is pivotably coupled to said edge region of said airbag outlet opening.

20. The housing configuration according to claim 18, wherein said cover is releasably latched to said edge region of said airbag outlet opening.

21. The housing configuration according to claim 1, wherein said airbag outlet opening in said upper housing wall extends substantially entirely over said airbag-accommodating space.

22. The housing configuration according to claim 1, wherein said housing is an extruded housing.

23. The housing configuration according to claim 1, including:
a gas duct having a gas-duct end segment protruding from said lower housing wall region and forming a gas distributor; and
said airbag module, when in the activated state, producing a flow of gas introduced via said gas duct from below into the airbag and inflating the airbag such that the air bag exerts a lift-off force on said covering device and, the flow of gas being directed via said gas duct in the airbag emergence direction exerting an additional lift-off force on said covering device.

24. In combination with a motor vehicle having a windshield, an occupant protection device, comprising:
a front passenger airbag module installed near the windshield, said front passenger airbag module having an airbag and a gas generator assigned to said airbag;
a housing having an airbag-accommodating space and a gas-generator-accommodating space formed therein;
said housing having an upper housing wall with an airbag outlet opening formed therein and having a covering device, said covering device being configured to close said airbag outlet opening when said front passenger airbag module is in a non-activated basic position and to open up said airbag outlet opening so that said airbag deploys freely when said front passenger airbag module is in an activated state;
said gas-generator-accommodating space accommodating said gas generator, said airbag-accommodating space accommodating said airbag such that said airbag is disposed folded up in said airbag-accommodating space behind said covering device when said front passenger airbag module is in the non-activated basic position;
said airbag outlet opening defining an airbag outlet opening plane, said airbag-accommodating space being situated, with reference to the airbag outlet opening plane, laterally next to said gas-generator-accommodating space;
said housing having a lower housing wall region disposed opposite said covering device and bounding said airbag-accommodating space;

said housing having a gas-generator-accommodating-space housing wall extending substantially parallel to said lower housing wall region;

a partition wall separating said airbag-accommodating space from said gas-generator-accommodating space, said partition wall extending in a direction away from said upper housing wall into an interior of said housing as far as said lower housing wall region;

said lower housing wall region and said gas-generator-accommodating-space housing wall together forming a gas-duct segment configured such that gas is guided along an airbag emergence direction away from a housing side opposite the airbag outlet opening plane and into the airbag; and said gas duct segment being disposed in said housing on the housing side opposite the airbag outlet opening plane, said gas duct segment extending substantially parallel to said airbag outlet opening plane and extending, when viewed in cross section through said housing, from said gas-generator-accommodating space to said airbag-accommodating space.

* * * * *